Dec. 12, 1950     DE VER K. WARNER     2,533,649
APPARATUS FOR MEASURING ORDINATES ON A STRIP CHART
Filed Nov. 23, 1946     2 Sheets-Sheet 1
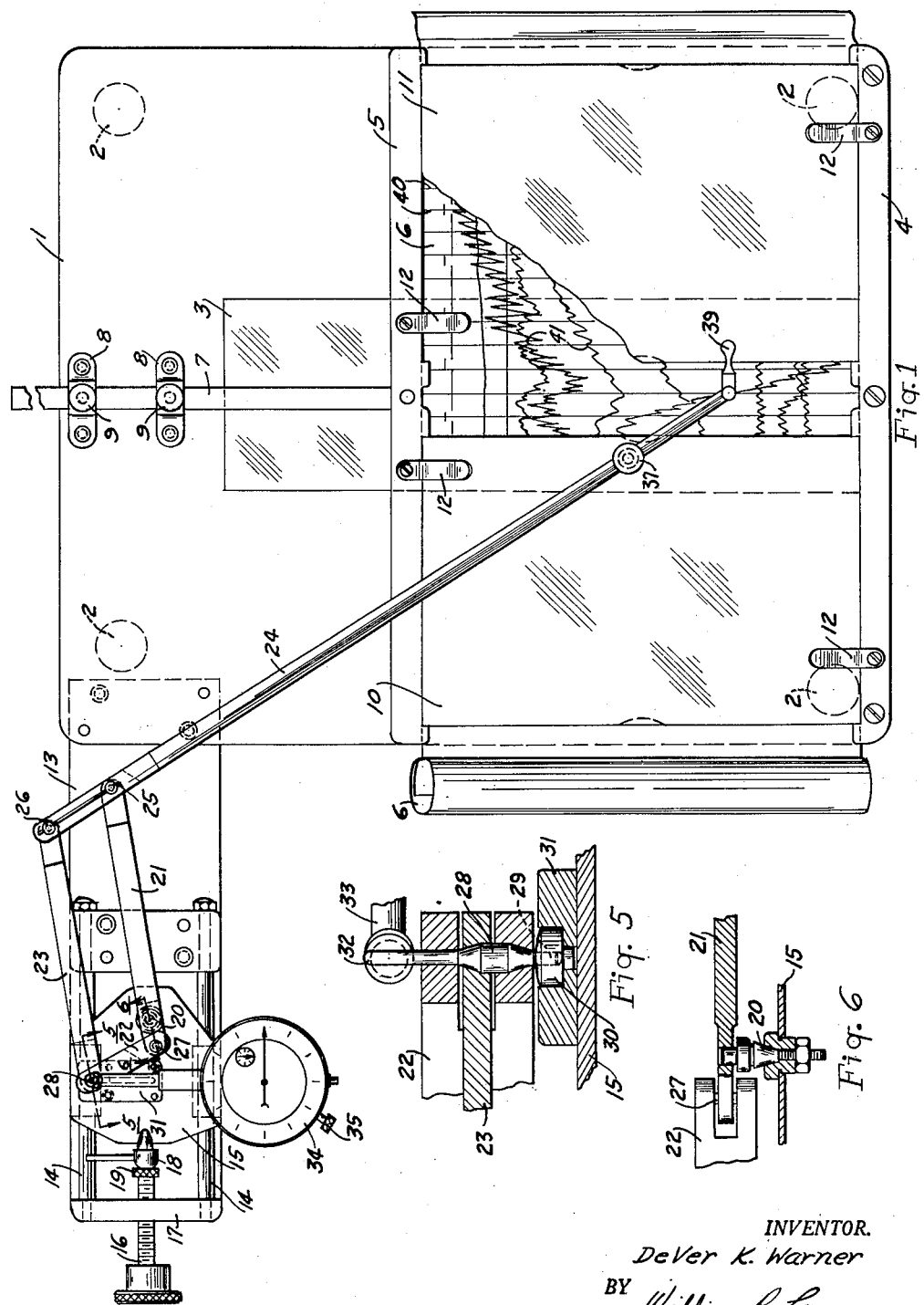
INVENTOR.
DeVer K. Warner
BY William R. Lane
Attorney Dec. 12, 1950 DE VER K. WARNER 2,533,649
APPARATUS FOR MEASURING ORDINATES ON A STRIP CHART
Filed Nov. 23, 1946 2 Sheets-Sheet 2
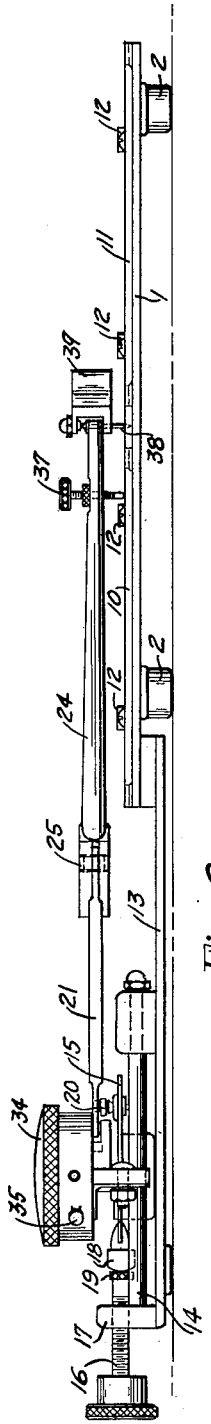
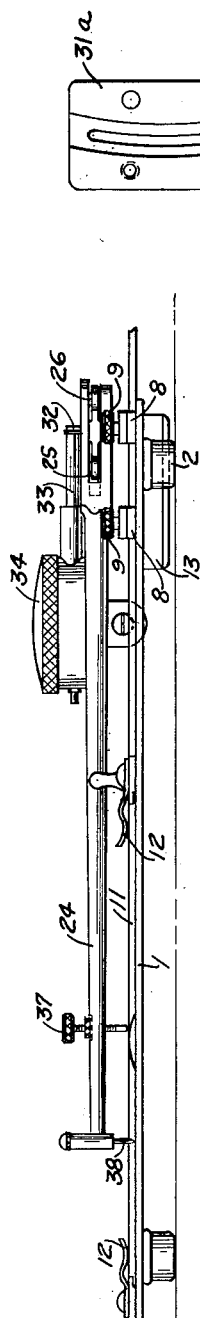
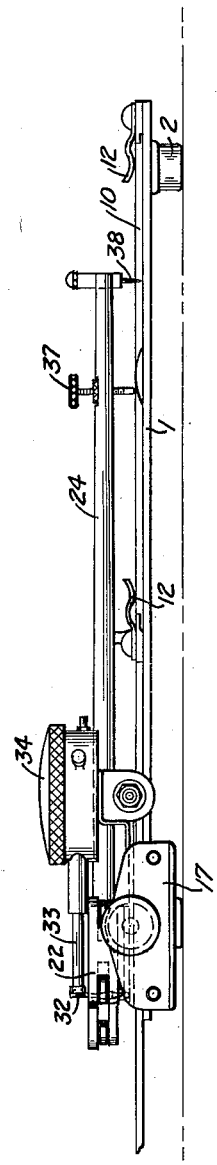
INVENTOR.
DeVer K. Warner
BY William R. Lane
Attorney Patented Dec. 12, 1950

2,533,649

UNITED STATES PATENT OFFICE 2,533,649

APPARATUS FOR MEASURING ORDINATES ON A STRIP CHART

De Ver K. Warner, Los Angeles, Calif., assignor to North American Aviation, Inc.

Application November 23, 1946, Serial No. 711,905

2 Claims. (Cl. 33—125)

This invention relates to an apparatus for quickly and accurately measuring ordinate distances of curves on a strip chart.

Strip charts with respect to which the present invention is designed to be used comprise a photographic recording of an oscillograph or other instrument which is responsive to oscillations or other variations from a normal condition. Record strips made from the oscillograph may contain one or several separate traces, each recorded by an individual unit. The recording mechanism is driven at an appropriate speed to correlate the time intervals with the test and, accordingly, there is indicated on the recording strip intervals of time representing abscissae which may be of a preselected interval. At the beginning of the oscillograph run the relative positions of the several recorders are indicated on the record strip by making an initial reference mark with each of the units at rest. One unit may be used to trace a continuous reference line not subject to any impulse, this line serving as a base from which ordinate measurements may be taken.

In the past it has been customary to measure the ordinate distances with a scale, a procedure which has proven to be time consuming as well as tedious and therefore one which invites errors.

It is therefore an object of this invention to provide an apparatus for quickly and accurately measuring ordinate distances on a strip chart.

It is a further object of this invention to provide an apparatus utilizing a tracer which can be placed at the ordinate of any given abscissa on a curve and to interconnect with the tracer an apparatus for visually indicating the ordinate distance from a preselected base.

It is a further object of this invention to provide an apparatus whereby a strip chart containing oscillograph records may be moved into successive abscissa positions whereby the ordinates of curves on said record chart may be read with facility.

It is another object of this invention to provide an apparatus for holding a record strip in place in a preselected position to facilitate reading of ordinate distances of curves transcribed thereon.

It is a further object of this invention to provide an apparatus wherein a sensitive gauge may be utilized to read ordinate distances on oscillograph record strips.

It is still a further object of this invention to proportionally interconnect tracer means and sensitive indicating means and to guide the same for movement only in an ordinate direction in its use with record strips.

Other objects of invention will become apparent from the following written description and the drawings, in which Fig. 1 is a top plan view of the apparatus constituting the present invention;

Fig. 2 is a side elevational view looking from the front in Fig. 1;

Fig. 3 is a side elevational view from the right in Fig. 1;

Fig. 4 is a side elevational view looking from the left in Fig. 1;

Fig. 5 is a cross-sectional view taken along the lines of 5—5 of Fig. 1;

Fig. 6 is a cross-sectional view taken along the line 6—6 of Fig. 1; and

Fig. 7 is a top plan view of a modified guide member.

Referring to the drawings, there is shown a base or table 1 suitably supported on feet 2 and containing a panel 3 for lighting from below. Attached to the table are a pair of guide members 4 and 5 for positioning and guiding a record strip 6. This strip may be a photographic recording containing longitudinally extending transcribed curves and transversely extending lines representing time intervals. Guide member 5 is adapted to be held in adjusted position by means of a rod 7 attached thereto, and a pair of guide means 8 and locking thumbscrews 9. Although guide means 4 is fixed to the table, it is to be understood that it can be adjustably mounted with respect thereto for the purposes of the present invention if so desired. Placed on the table over the strip chart, for holding the same in reading position, are panel members 10 and 11, suitably held in place by clamps 12. These panel members may be of any suitable material but in the preferred embodiment of the invention opaque or clear glass is used. It may be noted from Fig. 1 that the panels are separated to provide a space wherein the ordinates of the various curves on the record strip may be read. This separated space is over the transparent panel 3 through which light may be transmitted to illuminate the record strip and thereby facilitate reading the same.

Attached to the table is an extension 13 for supporting a pair of carriage slides 14 for adjustably mounting an indicator carriage plate 15. The indicator carriage plate is adjusted to desired position by means of screw 16 threaded in the member 17 and rotatable in member 18 which serves to attach the screw to the carriage plate.

A lock nut 19 is used to bind the screw with respect to the part 18 when it is desired to lock the carriage plate in adjusted position. Attached to the carriage plate by means of a pivot support 20 is a proportional means comprising a pivotal link 21, an arm 22, a link 23, and a pointer arm 24 which is bifurcated at one end to receive an end of pivotal link 21 and link 23. These links and arms are pivotally connected by pins at 25, 26, 27, and 28. Referring to Fig. 5, pin 28, in addition to connecting arm 22 to link 23, is provided with an extension 29 adapted to be press-fitted in an opening in a shoe 30 which in turn is adapted to be slidingly received in a guide block 31. Guide block 31 in turn is suitably fastened to carriage plate 15. Guide block 31 comprises a rectangular piece of material having a groove therein for receiving shoe 30. Pin 28 is also provided with an upward extension 32 adapted to bear against and operate carriage plunger 33 of a dial indicator gauge 34, of suitable design, which in turn is suitably attached to the carriage plate 15. The dial indicator gauge is of a type which includes a dial having a rotatable border portion which may be rotated for convenience in establishing an initial setting and held in adjusted position by means of a rim lock 35. The pointer arm 24 of the proportional means includes screw 37 for adjustably supporting the arm, a tracer point 38, and a handle 39. While the various arms and links of the proportional means may be suitably selected to constitute a desired ratio arrangement, in the preferred embodiment of the invention the ratio is ten to one. This is accomplished by making the pointer arm 24 ten times the length of the arm 22 and in making the distance 20—27 of pivotal link 21 one-tenth the distance 20—25.

It may be noted that in the preferred embodiment of the invention the guide block 31 extends in a direction at right angles to the longitudinal direction of the chart and the curves transcribed thereon and referred to generally as 41. Therefore the proportional arrangement, being pivoted at 20 and so guided by the block 31, always moves in such a way that the tracer point 38 moves parallel to the guideway in the block 31 and the time interval lines 40 on the chart which, for convenience, may be referred to as abscissa lines. Thus, in the event the abscissa lines on the chart 6 are curved, a guide block 31a, such as shown in Fig. 7, may be used having a correspondingly curved guiding portion so that the tracer point will follow such abscissa lines for the reading of the ordinates for any given abscissa.

In operation, a record strip 6 is placed on the table 1 and one edge is brought into contact with guide 4. Plates 10 and 11 are thereupon placed in position and guide 5 is adjusted to engage the other edge of the plates which are held by clamps 12. The record strip is moved by sliding the same upon the table 1 and under the plates 10 and 11 so as to bring the desired portion of the curve or curves thereon to a reading position between the plate members 10 and 11. The dial of the indicator gauge is adjusted and set, with the tracer point in any selected position with respect to the record strip, and ordinate readings for successive or selective abscissae are obtained by placing the tracer point in contact with the ordinate point on the curve for the selected abscissa, the reading on the indicator gauge with respect to a given base line on the strip being noted and recorded. When the desired ordinate readings have been taken for any or all of the curves on the record chart for any given abscissa, the record strip may be shifted to the next abscissa point or any other abscissa point whereupon the ordinate readings for that position of the record strip may similarly be obtained. If the abscissa lines are close together, the tracer point may be shifted laterally by adjustment of the carriage plate 15 through screw 16.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A device for measuring ordinate distances at preselected abscissae on a record strip having one or more curves transcribed thereon, comprising means for adjustably holding said record strip, tracer means guided for movement in an ordinate direction, means for visually indicating the ordinates measured by said tracer means, and proportional means interconnecting said tracer and indicating means for operating said indicating means in response to movement of said tracer means, said proportional means comprising pivotally connected arms constituting a parallelogram arrangement, pivot means intermediate the ends of one of said arms for supporting said parallelogram arrangement, another of said arms having an extension beyond the parallelogram for attaching said tracer means, and a guide associated with one of said pivot connections for allowing movement only in the ordinate direction of said curves, said pivot connection also operatively engaging said visual indicating means.

2. A device for measuring ordinate distances at preselected abscissae on a record strip having one or more curves transcribed thereon, comprising a base member adjustable in the plane of said record strip for holding said record strip, tracer means guided for movement in an ordinate direction, means for visually indicating the ordinates measured by said tracer means, and proportional means comprising a parallelogram arrangement connecting said tracer and indicating means for operating said indicating means in response to movement of said tracer means.

DE VER K. WARNER.

REFERENCES CITED

The following references are of record in the file of this patent:

UNITED STATES PATENTS

| Number | Name | Date |
| --- | --- | --- |
| 409,891 | Wills | Aug. 27, 1889 |
| 672,123 | Delanoy | Apr. 16, 1901 |
| 688,783 | Keiley | Dec. 10, 1901 |
| 1,182,487 | Huebner | May 9, 1916 |
| 1,506,704 | Williamson | Aug. 26, 1924 |
| 2,393,474 | Jones | Jan. 22, 1946 |
| 2,424,619 | Keepers | July 29, 1947 |